(12) United States Patent
Banerji et al.

(10) Patent No.: US 7,937,604 B2
(45) Date of Patent: May 3, 2011

(54) METHOD FOR GENERATING A SKEW SCHEDULE FOR A CLOCK DISTRIBUTION NETWORK CONTAINING GATING ELEMENTS

(75) Inventors: Revanta Banerji, Beacon, NY (US); David J. Hathaway, Underhill, VT (US); Alex Rubin, Sunnyvale, CA (US); Alexander J. Suess, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 11/737,289

(22) Filed: Apr. 19, 2007

(65) Prior Publication Data

US 2008/0263488 A1    Oct. 23, 2008

(51) Int. Cl.
G06F 1/12      (2006.01)
G06F 13/42    (2006.01)
H04L 5/00     (2006.01)
H04L 7/00     (2006.01)

(52) U.S. Cl. ........ 713/401; 713/400; 713/500; 713/502; 713/503

(58) Field of Classification Search .................. 713/400, 713/401, 500, 502, 503
See application file for complete search history.

(56) References Cited

U.S. PATENT DOCUMENTS

| | | | | |
|---|---|---|---|---|
| 5,452,239 A * | 9/1995 | Dai et al. | ......... | 703/19 |
| 6,550,044 B1 * | 4/2003 | Pavisic et al. | ...... | 716/6 |
| 6,550,045 B1 * | 4/2003 | Lu et al. | ............. | 716/6 |
| 6,698,006 B1 * | 2/2004 | Srinivasan et al. | ............. | 716/10 |
| 7,039,891 B2 * | 5/2006 | Tetelbaum | ....... | 716/13 |
| 7,047,504 B2 * | 5/2006 | Kawano | ............. | 716/2 |
| 2003/0037306 A1 * | 2/2003 | Gutwin et al. | .......... | 716/6 |
| 2003/0135836 A1 * | 7/2003 | Chang et al. | ............. | 716/11 |
| 2005/0050497 A1 * | 3/2005 | Tetelbaum | ....... | 716/6 |
| 2005/0120318 A1 * | 6/2005 | Goko et al. | ....... | 716/6 |
| 2005/0131670 A1 * | 6/2005 | Wang et al. | ............. | 703/23 |
| 2007/0033561 A1 * | 2/2007 | Jones et al. | .......... | 716/6 |
| 2008/0072198 A1 * | 3/2008 | Celik et al. | .......... | 716/6 |

* cited by examiner

*Primary Examiner* — Thomas Lee
*Assistant Examiner* — Jaweed A Abbaszadeh
(74) *Attorney, Agent, or Firm* — H. Daniel Schnurmann (57) ABSTRACT

A method for generating a skew schedule for a clock distribution network generates a schedule that accounts for both the timing requirements of the memory elements at the endpoints of the clock distribution network and the timing requirements of the gating signals that feed clock gates and other clock control elements within the clock distribution network. The method provides a total solution to the skew scheduling problem by way of a two-phase iterative process. The two phases of the process alternately keep track of the schedule generated by first taking the gating elements of the clock distribution network into account, followed by balancing any remaining skew that may exist on the memory elements of the same clock distribution network. Finally, the method describes a procedure to post-process the skew schedule to ensure that it can be implemented using a clock tree generation tool.

9 Claims, 6 Drawing Sheets

METHOD FOR GENERATING A SKEW SCHEDULE FOR A CLOCK DISTRIBUTION NETWORK CONTAINING GATING ELEMENTS

FIELD OF THE INVENTION

The present invention generally relates to the field of Design Automation of Very Large Scale Integrated (VLSI) circuits, and more particularly, to generating useful skew schedules for clock distribution networks that contain gating elements.

BACKGROUND OF THE INVENTION

Sequential logic circuits or networks are typically controlled by one or more periodic clock signals which synchronize the storage of new data values in the various memory elements of the circuit, including flip-flops, latches, memory arrays, and the like. A clock distribution network is designed so that clock signals arrive simultaneously at all memory elements of the circuit, in which case, every signal propagation path between memory elements must have a delay less than the clock period.

Alternatively, the arrival time (AT) of the clock at each memory element may be adjusted using various Clock Skew Scheduling (CSS) algorithms to accommodate differences in delays of different memory element to memory element paths, maximizing the frequency (minimize the clock period) at which the network operates. CSS algorithms work by introducing AT adjusts at the endpoints of the clock distribution network (clock inputs of the memory elements of the sequential circuits), specifying that the clock AT at an endpoint (or equivalently, the clock distribution delay to the endpoint) should be at a certain amount earlier or later than the "nominal" clock distribution delay. The AT adjusts are then passed to a clock distribution generation process that builds a clock distribution network (e.g., a clock tree) that, as closely as possible, implements these AT adjusts.

Figure 9:
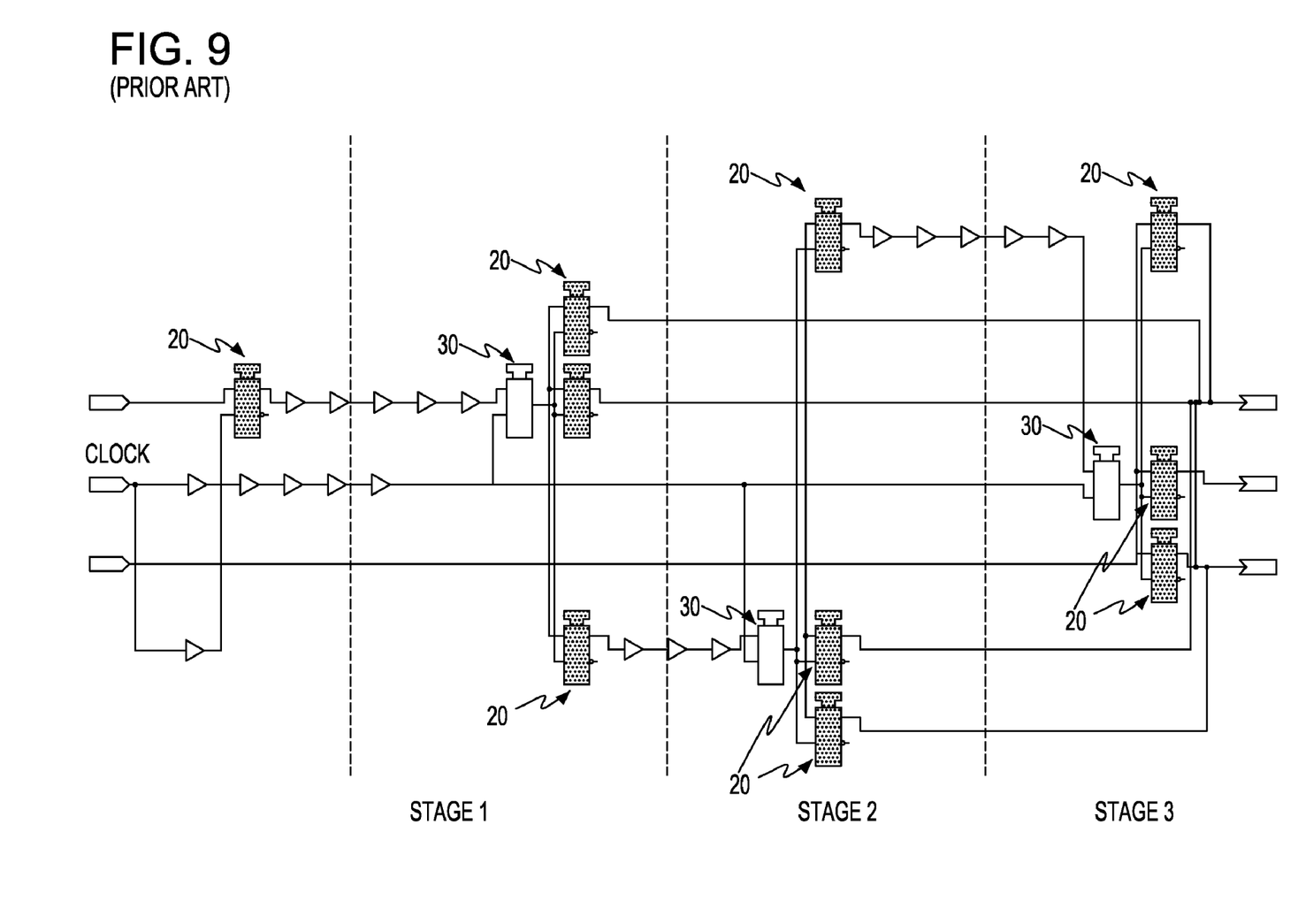

Referring to FIG. 9, there is shown an illustrative instance within a real design that illustrates the complexity involved in the gating circuitry, and the inherent problems of not being able to take the gating elements into account when adjusting the skew at the endpoints of the clock distribution network. FIG. 9 shows three stages of memory elements, including clock gated memory elements whose data outputs in turn control other clock gating elements. In such cases, timing constraints on the control inputs to gating elements 30 are not considered by a conventional CSS algorithm that focus only on the endpoints 20 of the clock distribution network. In this case, the clock signal passes through the clock gating elements 30 to reach the clock endpoints 20, i.e., the clock gates and clock distribution network endpoint elements are serially connected within the clock distribution network. Although the serially connected clock gate and endpoint have no intervening circuits in this example, in general they may be separated by other circuitry, such as clock buffers or inverters. More complex clock networks may occur in which multiple clock gate elements occur along the path from the clock source to one or more clock endpoints. Other clock signal processing elements, such as pulse shapers or clock multiplexers, may also occur within the clock distribution network. These elements will be collectively referred to as clock gates, while non-clock control signals feeding these elements will be referred to as clock gate enable signals.

Meeting the timing requirements of complex circuitry such as that shown in FIG. 9 requires that the CSS algorithm account for both the timing requirements of the memory elements at the endpoints of the clock distribution network and the timing requirements of the gating signals that feed the clock gates and other clock control elements within the clock distribution network.

Figure 1:
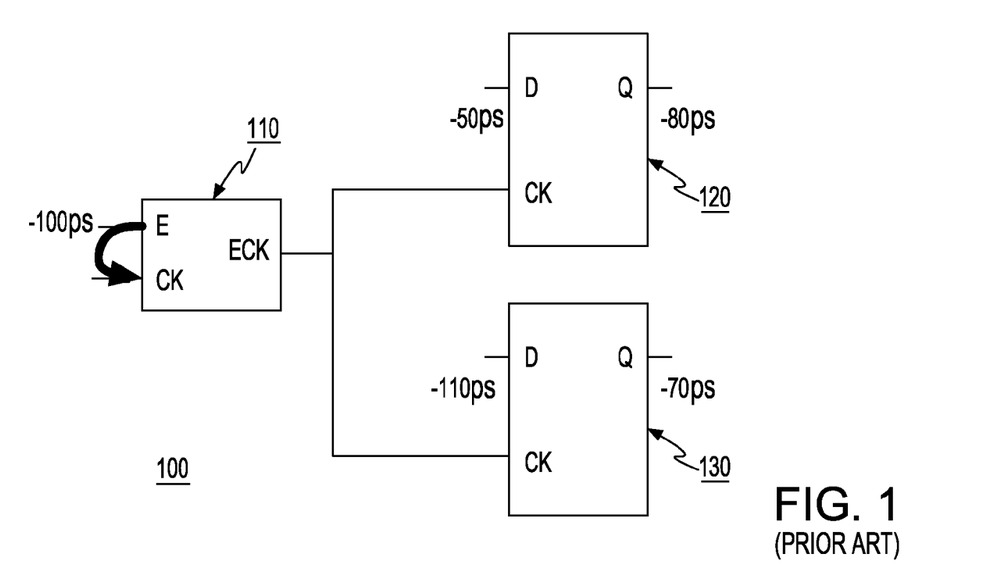
FIG. 1 is an illustrative circuit used to describe a prior art method for addressing a clock distribution network having an unbalanced skew and gating elements.

Referring now to FIG. 1, there is shown a sample situation that occurs in an illustrative circuit consisting of a gating element that provides the function of gating a clock signal driving two downstream sequential elements. The sequential elements represent the endpoints of the clock distribution network. This figure further represents a single stage of memory element and its associated clock gating element in the multi-stage example shown in FIG. 9. The clock signal arrives at pin CK and is enabled (i.e., propagated to output ECK) when the data signal at input E is active. The output pin ECK of the gate is connected to the CK clock inputs that trigger (i.e., cause new data to be stored in) the downstream sequential elements. The gating element is labeled in the figures as 110, and the two downstream sequential elements are labeled 120 and 130.

Late mode timing slack (or simply slack) of a signal is defined as the difference between the earliest time that a signal may be required to arrive (or reach a stable state) in order to satisfy timing requirements and the latest time it may actually arrive. In the case of a clock gate element, the data signal is required to arrive before the clock signal so that no clipping (shortening) or glitching (partial pulse propagation) of the clock signal occurs. The local slack at gating element 110, defined as the difference between the earliest time the clock signal can switch and the latest time the data signal may actually switch, is −100 ps. This clock signal at gating element 110 then drives the CK pins of the sequential elements through the ECK pin, resulting in local slacks at the sequential elements of −50 ps at 120 and −110 ps at 130. The slack visible at the output end of these sequential elements is −80 ps at sequential element 120, and −70 ps at sequential element 130. The goal of any CSS algorithm is to balance the skew at the CK pins by balancing the slack between the input and output sides of the sequential elements.

Figure 2:
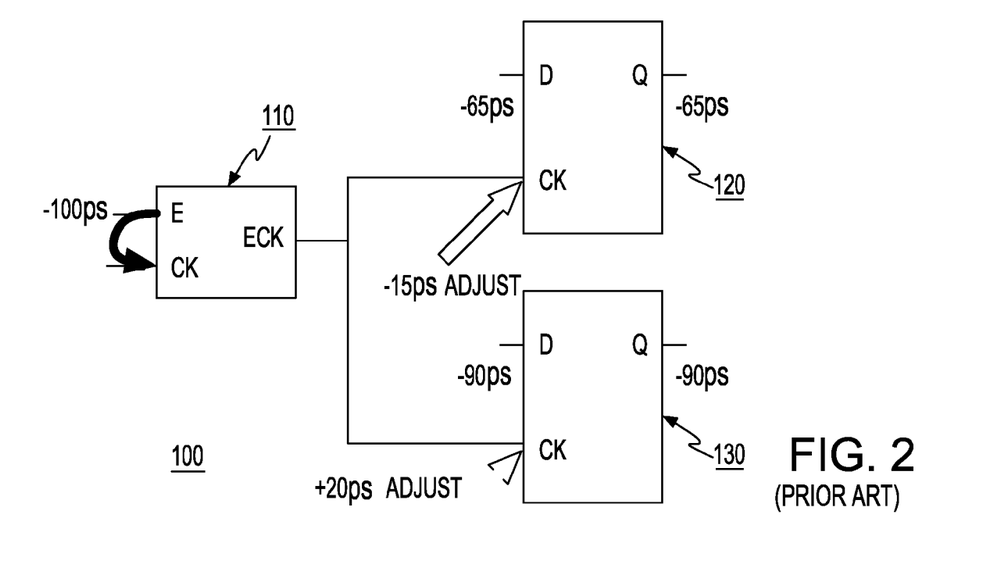
FIG. 2 is an illustrative circuit showing the result of applying a single iteration of a prior art CSS algorithm to the circuit of FIG. 1.

Referring now to FIG. 2, there is shown an instance after a single iteration of the iterative CSS algorithm that attempts to balance the slacks. The slack is balanced by applying an adjust to the clock AT at the CLK pin given by ½(output slack−input slack). In the present example, the result is a −15 ps adjust on the sequential element 120, and +20 ps on the sequential element 130. For simplicity, it is assumed that the adjusts at elements 120 and 130 may be implemented by varying the delay of the connections between them and element 110, and thus the clock arrival time at pin CK of 110, and hence its slack, is unchanged (this assumption will be removed in a latter description of the invention). As illustrated in the example, a conventional CSS algorithm typically improves the worst slack in the design, but the critical slack is now located at the gating element 110 and cannot be improved further with CSS adjusts at the clock distribution network endpoints.

Introducing CSS AT adjusts only at the endpoints of the clock distribution network are sufficient when all the critical paths in the circuit involve just these clock distribution network endpoints. However, with recent increases in the use of gating circuits within a clock distribution network to reduce power and/or improve the performance of the sequential network of which it is a part, it is often the case that the critical paths involve the clock gating elements, rather than the clock distribution network endpoints. These are not taken into account by conventional CSS algorithms. The situation is complicated further when outputs of clock gated sequential elements themselves generate signals that control other clock gating elements, as illustrated in FIG. 9.

The solution to this problem is not as simple as taking the gating element into account as just another endpoint of the clock distribution network. This may result in the slack being balanced at the gating point, but cause the ATs at the clock endpoints fed by the gated clock to be pushed out further than necessary. The fundamental problem is that existing CSS algorithms do not properly consider the necessary relationship between AT adjusts at different points that are serially connected along a single path in a clock distribution network (e.g., at a clock gating element and at the clock distribution network endpoints fed by it).

Generally, when balancing skew on the clock distribution network, the enable inputs of the clock gating elements are not taken into account. There are algorithms for skew scheduling, but no specific algorithms that take the enable input into account.

Therefore, there is a need in industry for a method and a system that generates the Clock Skew Schedule (CSS) for a clock distribution network that includes clock gating elements.

OBJECTS AND SUMMARY OF INVENTION

Accordingly, it is an object of the invention to provide a method and a system that generates a skew schedule for a clock distribution network including clock gating elements.

It is another object to provide a method and a system to create CSS adjusts for both clock inputs of clock gating elements and clock inputs of serially connected downstream sequential elements they feed, and further to ensure that timing requirements of both serially connected elements are accounted for in generating these adjusts.

It is a further object to account for the dependency between the enabling gating element and downstream sequential elements using preferably a two-Phase approach to cause CSS adjusts generated by the normal CSS iterative process be made in a way that is influenced by the timing requirements of gating elements in the clock distribution network.

It is still another object to provide a method and a system that applies CSS adjusts to each of several serially connected elements in a clock distribution network.

In one embodiment of the invention, there is provided a method and a system that takes into account bad skews at the gating elements along the clock tree. (e.g., enable tree). The inventive method is preferably subdivided into two Phases: a Phase I, wherein arrival times at the downstream latches are adjusted by taking the gating elements into account, and a Phase II, wherein any remaining skews on the memory elements, such as latches, are worked on to determine whether finer adjustments ought to be made. Both, Phase I and Phase II are preferably performed iteratively.

The method of the present invention thus provides a skew schedule that generates adjusts for each of multiple serially connected elements in the clock distribution network.

In one aspect of the invention, an upstream element of a plurality of serially connected elements feeds at least one downstream element of the plurality of serially connected elements.

In another aspect of the invention, there is provided a method that includes the steps of: a) computing a first adjust for each of a plurality of downstream elements; b) determining a second adjust for an upstream element as a common portion of the first adjust of the plural downstream elements; and c) generating a final adjust for each of the plural downstream elements.

In a third aspect of the invention, there is provided a program storage device readable by machine, tangibly embodying a program of instructions executable by the machine to perform method steps for scheduling a skew that accounts for unbalanced gating elements of a clock tree, the gating elements driving downstream sequential elements of the clock tree, the sequential elements being end points of the clock tree, the clock tree being integral to a netlist describing a design of a VLSI chip, the netlist being represented by a timing graph, the method steps including: a) identifying a timing requirement of at least one of the unbalanced gating elements; and b) using the identified timing requirement to generate an adjust for at least one of the downstream sequential elements of the gating element.

BRIEF DESCRIPTION OF DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

FIG. 9 is a circuit diagram showing a prior art multiple gating scheme to which the present method can be applied to.

DETAILED DESCRIPTION OF A PREFERRED EMBODIMENT

The present invention and the various features and advantageous details thereof are explained more fully with reference to the non-limiting embodiments that are illustrated in the accompanying drawings and detailed in the following description.

FIGS. 3 through 6 refer to the illustrative circuit previously described with reference to prior art FIGS. 1 and 2.

A preferred embodiment of the invention will now be described with reference to FIGS. 7 and 8 that show an illustrative flowchart to be taken in conjunction with FIGS. 3 through 6, which graphically illustrate the result of executing the various steps of the flow chart being described.

Figure 7:
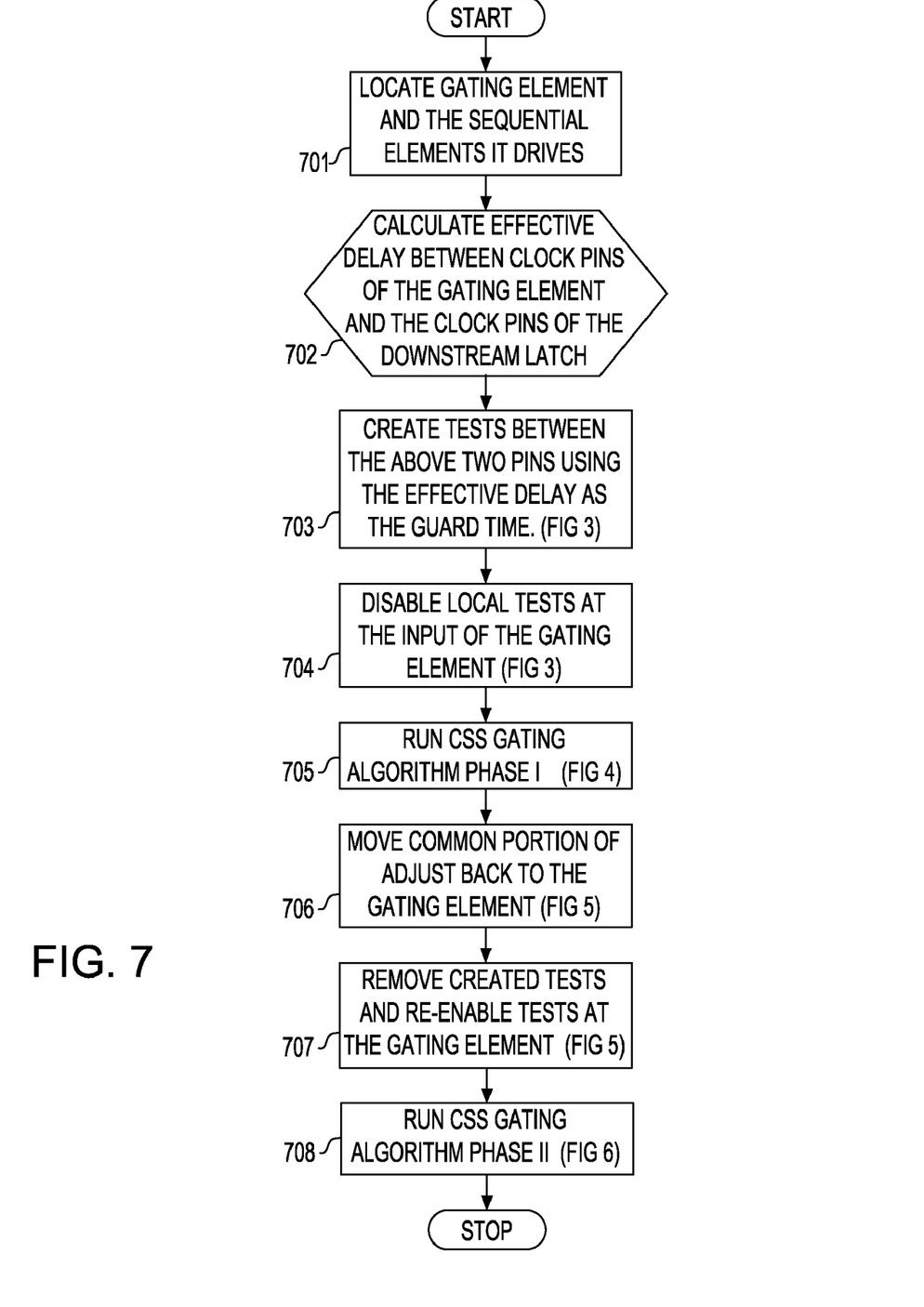
FIG. 7 is a flowchart illustrating the steps of the present invention taking the gating elements into account.

Referring now to FIG. 7, and more particularly to step 701, the information required to drive this algorithm identifies the critical gating elements in the design that need to be taken into account when generating the skew schedule. These may be obtained in one of two ways:

a) The specific gating elements to be taken into account may be pointed out by the user; and b) The gating elements can be located by tracing back from the endpoints of the clock distribution network to determine which of the driving gating elements have unbalanced skew and a critical slack.

Although only critical gating elements are considered in this embodiment, it may also be desirable to include gating elements that are not initially critical (i.e., that do not have an unbalanced or negative slack), as it may be desirable when implementing CSS adjusts at the sequential elements fed by such gating elements to adjust the clock AT at the input of the gating element, causing a previously non-critical gating element to become critical.

Referring to step 702, the effective delay between the gating element and each of the individual downstream sequential elements that it drives is calculated by tracing a path between them. Let this delay be $Delay_{Eff}$. Since the clock distribution network is generally not implemented at the time when the CSS algorithm is executed, $Delay_{Eff}$ will be an estimate of the expected delay between these elements. It may be advantageously represented by a single delay estimate having an upper and lower bound ($Delay_{Eff\_Min}$ and $Delay_{Eff\_Max}$) on the expected path delay that may be achieved at a reasonable cost (e.g., circuit area, wire resource, power) by a subsequent clock distribution generation step. In practice, there will be some delay through the clock gating element, the path between the clock gating element and the sequential elements possibly including delays of intervening buffers or inverters (not shown) and the sequential elements. There will also be a setup time requirement between the CK and E pins of the gate element and between the CK and D pins of the sequential element (FIG. 1) that must be included in the slack computations of these elements. These factors are omitted here for simplicity, although they contribute to determining the $Delay_{Eff}$, $Delay_{Eff\_Min}$, and $Delay_{Eff\_Max}$ values.

Figure 3:
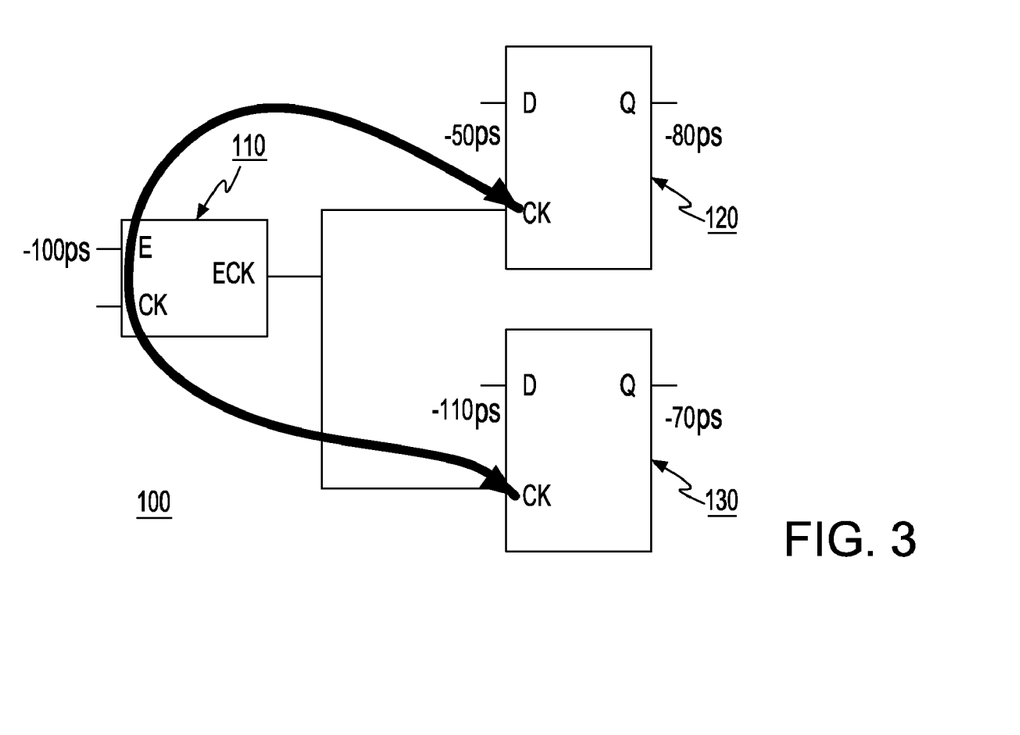
FIG. 3 is an illustrative circuit describing the movement of tests downstream to make the CSS algorithm consider timing requirements of the gating elements (Phase I), according to a preferred embodiment of the present invention.

Referring now to step 703 to be described in conjunction with FIG. 3, there is shown the movement of local tests at the input of the gating element 110 to the downstream sequential elements 120 and 130. This is the pre-processing required prior to launching Phase I of the algorithm. It results in a −100 ps slack at the input of the gating element 110 to be visible when clock AT at the CK pins of the downstream sequential elements 120 and 130 are being adjusted. The minimum effective delay $Delay_{Eff\_Min}$ is used as a guard time to create a test between the E pin of gating element 110 and the CK pin of downstream sequential elements 120 and 130. For simplicity, $Delay_{Eff\_Min}$ will be assumed to be 0 in the present example. Assuming that AT of the data signal at the input of the gating element is $AT_{gating}$, and AT of the clock signal at the sequential element is $AT_{sequential}$, the test created between these two points is:

$$Slack = AT_{sequential} - (AT_{gating} + Delay_{eff\_Min})$$

Referring to step 704, once the test has been created as described in FIG. 3, the local test at the gating element 110 is disabled. This local test is no longer required since it has now been moved to the downstream sequential elements 120 and 130.

Figure 4:
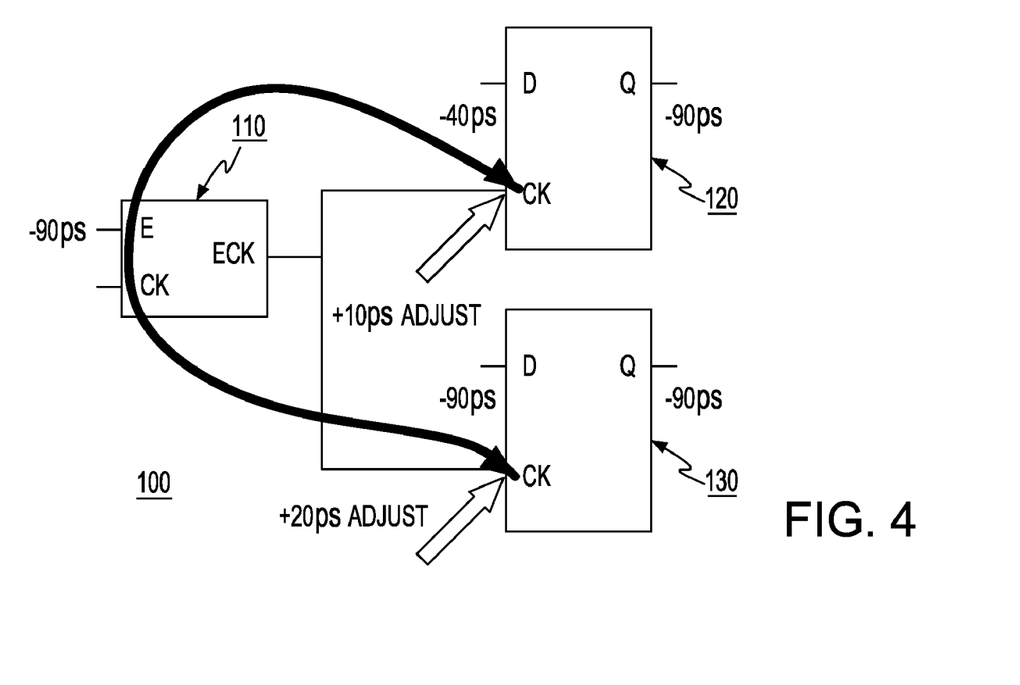
FIG. 4 is an illustrative circuit showing the resulting skew adjusts computed based on the test movement of FIG. 3. (Phase I)

Referring now to step 705 to be considered in conjunction with FIG. 4, the result of running the iterative CSS algorithm during Phase I, is illustrated. Adjusts now applied at the downstream sequential elements 120 and 130 take into account the slack at gating element 110. For the sequential element 120, the input slack now seen is the slack created by the new test of −100 ps, and the adjust is (−80−(−100))=+10 ps, where it was −20 ps earlier. This illustrates that AT adjusts at the CK pins are being applied with the knowledge of the critical slacks at the gating elements. The adjust of +20 ps at the CK pin of the sequential element 130 remains unchanged. The worst slack in the design with this new approach has been improved to −90 ps in a single iteration, whereas the slack could only have been improved to −100 ps using a conventional single Phase CSS algorithm.

Phase I is referred to the Gating Skew Dependant Phase, and is the Phase where a gross adjustment is applied based on the critical gating elements. In the present illustration that is described using gates 110, 120, and 130, the slack was balanced in a single iteration. However, it is more often the case that it takes more than a single iteration to produce a balanced skew across the netlist.

Figure 8:
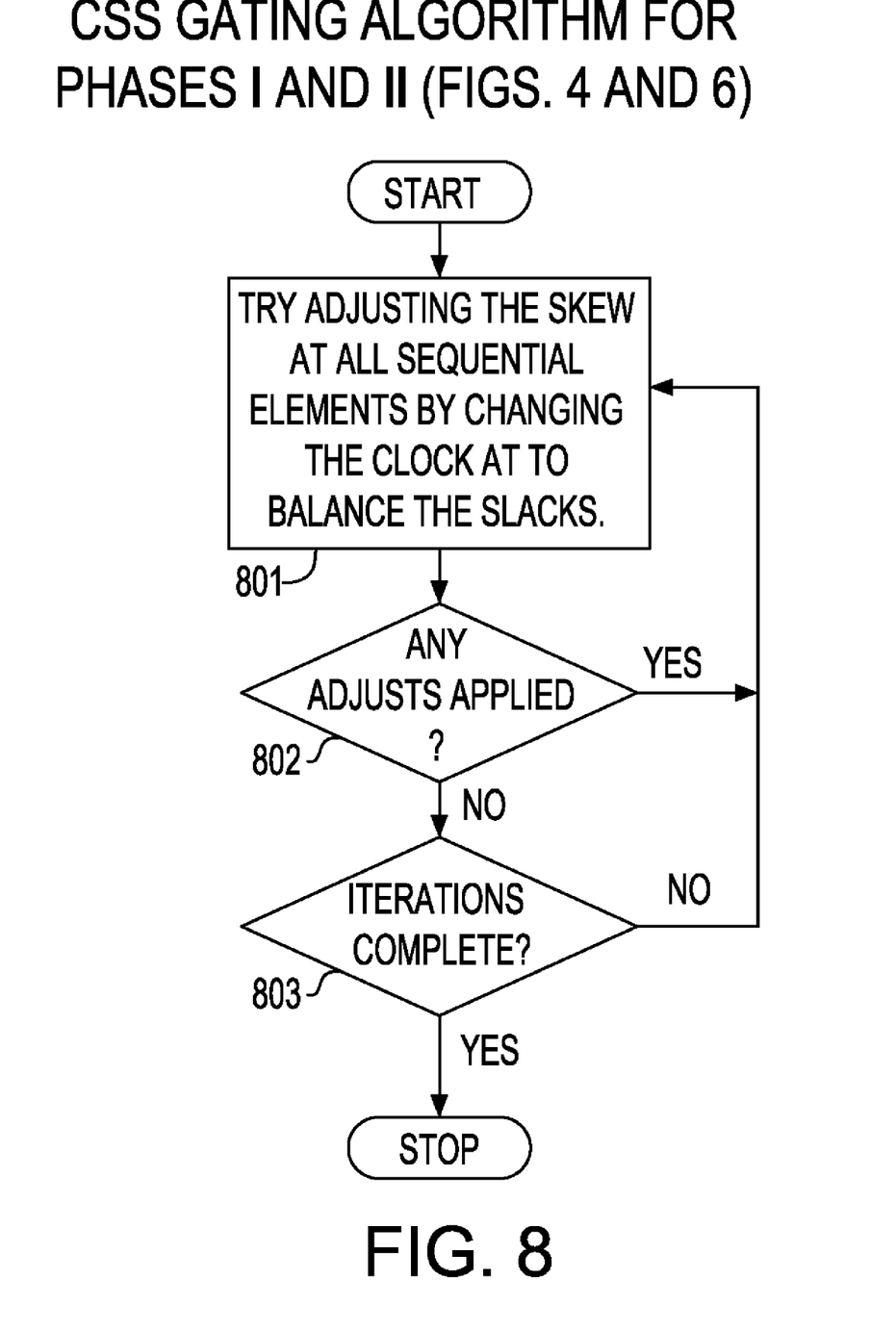
FIG. 8 is a flowchart illustrating an embedded process invoked by the flow chart shown in FIG. 7 to adjust the clock AT at endpoints of the clock distribution network. (Phases I and II of the Gating Aware CSS algorithm used in conjunction with FIGS. 4 through 6)

Now, referring to step 801 in FIG. 8, the step of adjusting all the clocks' ATs was described above with reference to FIG. 4.

Referring to step 802, a check is performed to determine whether any new clock AT adjusts were applied during the current iteration of the algorithm. If the answer is 'yes', the algorithm continues until no new adjusts are applied—which is indicated of a balanced skew in the netlist. Otherwise, the algorithm continues to a subsequent iteration.

Referring to step 803, a check is performed to establish whether a predetermined number of iterations as specified by the user, or by an algorithm default has been reached. If so, it leads to completion of the conventional iterative CSS algorithm.

Figure 5:
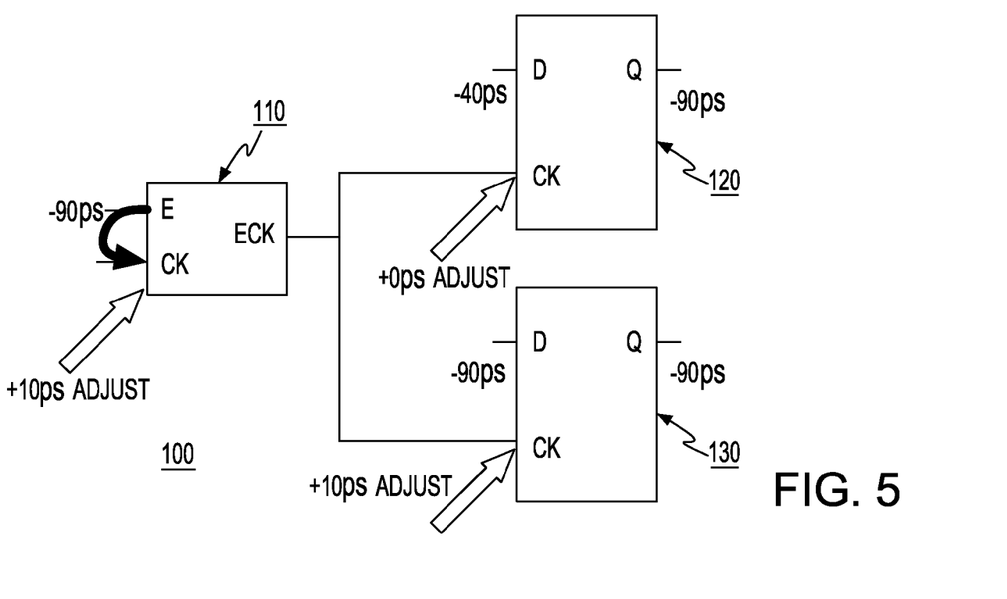
FIG. 5 is an illustrative circuit showing the common portion of the skew adjusts being moved back to the gating elements. (Phase I)

Referring back to the flow chart of FIG. 7, with reference to step 706, taken in consideration with FIG. 5, the state of the circuit after completing Phase I is described, showing the process of moving the common portion of the adjusts back to the gating element 110 (FIG. 5) The common portion of the AT adjusts at the CK pins of the downstream sequential elements is +10 ps. The common portion of the AT adjusts for a set of endpoints fed by a common gating element is defined as the minimum over all the endpoints of the adjust at the endpoint minus $Delay_{Eff\_Min}$. This is moved back to the CK pin of the gating element 110, leaving the remaining adjust on the downstream sequential elements. In this case, it results in +0 ps on sequential element 120, and +10 ps on sequential element 130.

Referring to step 707, still in conjunction with FIG. 5, since the gating element has received the common adjust portion, the tests created for Phase I can be removed, and the local tests at the gating element 110 are re-enabled. This prepares the circuit for the start of Phase II of the gating aware CSS algorithm.

Figure 6:
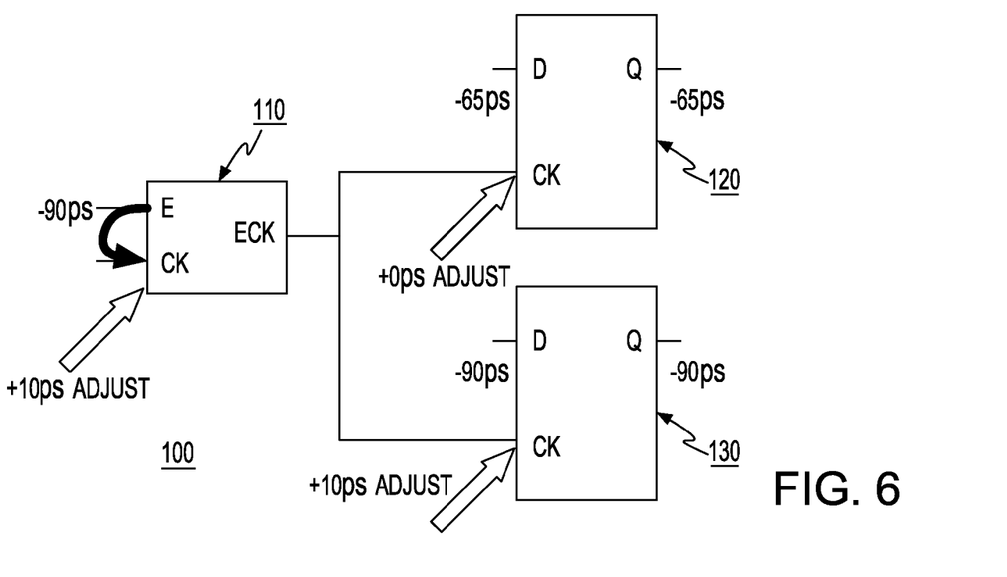
FIG. 6 is an illustrative circuit showing the result of running CSS after taking the gating elements into account (Phase II), in accordance with a preferred embodiment of the present invention.

Referring to step 708, in conjunction to FIG. 6, adjusts applied at the CK pins of the downstream sequential elements 120 and 130 (FIG. 5) during an iteration of Phase II are illustrated. This Phase is similar to an iteration of the regular CSS algorithm, which has been described previously by referring to steps 801, 802 and 803 of (FIG. 8). Since Phase I has already taken the gating elements into account, Phase II only looks at the remaining balancing that needs to be performed to sequential elements 120 and 130. To ensure that adjusts are not created the endpoint elements that would require an unmanageable small (or negative) delay between the gating element and the endpoint, the AT adjusts generated in Phase II will be constrained to be greater than or equal to $Delay_{Eff\_Min}$ minus $Delay_{Eff}$. If $Delay_{Eff}$ at an endpoint is already at its minimum achievable value, it is indicative that the AT adjust at the endpoints must be greater than or equal to zero.

In the present example, and still referring to FIG. 5, the result does not alter adjusts at either endpoint 120 or 130. If not for constraining the Phase II adjust values, the adjust at endpoint 120 would be −25 ps, but it would require a negative delay between the gating element 110 and endpoint 130, which is not possible. The adjusts at the endpoints need to be added to the adjust already at the CK pin of the gating element 110 to determine the total effective movement of the clock ATs of the sequential elements due to both Phases I and II. In general, there may be additional changes in the endpoint AT adjusts in Phase II, particularly in cases requiring multiple iterations of the loop in the CSS algorithm of FIG. 8. For example, the improvement in slack at element 110 due to the movement of the common portion of the adjust back to element 110 may create an improvement in the slack of a memory elements feeding its enable pin, and the application of Phase II of CSS may result in a modification of the AT adjust of such an element. Phase II, also referred to as the Fine Adjustment Phase, is complete at this stage.

As in prior art CSS algorithms, the resulting AT adjusts are used as inputs to the clock distribution network generation method that configures a clock distribution network (e.g., a clock tree) that incorporates these adjusts as closely as possible.

In the present embodiment of the invention, only a single stage of clock gating has been described so that AT adjusts are applied to only two serially connected elements in the clock tree (the gating element and the endpoint). But in more general cases, there may be multiple levels of clock gating, e.g., a clock gate feeding another clock gate feeding an endpoint, to form sets of N serially connected elements in the clock tree. In such instances, the two Phases previously described are advantageously replaced by N Phases. Assuming that the serially connected elements in the clock tree are numbered back from the endpoints, such that the endpoints (memory elements) are at level N, the gates directly feeding them (possibly through ungated buffers or inverters) become level N−1, the gating element feeding it become level N−2, gating elements become level N−3, and the like. The first level of clock gating elements encountered by a clock signal as it traverses the clock distribution network will then become level 1. If one branch of the clock distribution network has fewer levels of gating elements than another, its first clock gating element will have a level number greater than one, i.e., the level numbering is always done by starting at the endpoints and counting back from N. Using this numbering scheme, Phase i of the algorithm (for i<N) will compute delays between the elements at level i and the endpoints, as shown in step 702 (FIG. 7), create tests between enable inputs of all elements at levels greater than i and the clock inputs of the level N (endpoint) elements, as in step 703 (FIG. 7), and disable tests at the endpoint (level N) elements as in step 704 (FIG. 7). If some of the endpoints of the clock distribution network are fed by fewer than N levels of clock gating elements, these operations of steps 702 through 704 will be applied in Phase i only to endpoints that are fed by a level i gating element. The CSS algorithm is then run as in step 705 (FIG. 7), applying to all endpoints, including those not fed by a level i gating element. For those endpoints fed by a level i gating element, the common portion of the AT adjust will be moved back to the clock inputs of the level i elements. The tests created are then removed as in step 707 (FIG. 7), but instead of proceeding to step 708, the algorithm will return to step 703 to perform Phase i+1 of the algorithm. Looping continues until Phase N−1 is reached, at which point the algorithm proceeds from the final iteration of step 707 to step 708, and finishes.

Although only late mode data and clock gate enable signal slacks are considered here, means for computing early mode slacks and using them in CSS algorithms are well known, and the inventive method may be applied to such early mode problems as well. If both early and late mode timing are considered by the CSS algorithms, a single adjust must be generated for both, since these adjusts represent delay differences to be implemented in the clock distribution network, and separate physical implementations cannot be generated for early and late mode. In this case bounds on the late mode adjust will typically first be generated by determining for each element to which an AT adjust is applied the range of such adjusts that would not cause a negative late mode slack, or if this range is empty (i.e., it is impossible to avoid a negative slack), the value that exactly balances the late mode slacks for the element. Early mode CSS algorithm is then applied using the ranges determined by the late mode CSS algorithm as bounds.

In conclusion, skew of gating elements can be taken into account by changing an iterative skew schedule generator. When the critical slacks are at gating elements, the worst slack in the design can be improved further by way of the method described in the present invention.

Finally, the present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the invention was described by means of a simple illustrative example, it is to be understood that one of ordinary skill in the art can extend and apply this invention in many obvious ways. It should be understood, however, that the description, while indicating preferred embodiments of the present invention and numerous specific details thereof, is given by way of illustration and not of limitation. Many changes and modifications may be made within the scope of the present invention without departing from the spirit thereof, and the invention includes all such modifications.

What is claimed is:

1. A method for scheduling a skew that accounts for unbalanced gating elements of a clock tree, said gating elements driving downstream sequential elements of said clock tree, said sequential elements being end points of the clock tree, said clock tree being integral to a netlist describing a design of a VLSI chip, said netlist being represented by a timing graph, the method comprising the steps of:

a) identifying a timing requirement of at least one of said unbalanced gating elements; and b) using said identified timing requirement to generate an adjust for at least one of said downstream sequential elements of said gating element.

2. The method of claim 1, wherein the downstream sequential elements are memory elements.

3. The method of claim 1, wherein at least one upstream element includes a clock gating element.

4. The method of claim 1 further comprising the step of identifying critical gating elements in the design to be entered in the skew schedule.

5. The method of claim 1, wherein critical gating elements are selected by a user.

6. The method of claim 1, wherein minimum effective delay $\text{Delay}_{\textit{Eff-Min}}$ is used as a guard time to create a test between the gating element and a clock pin of the downstream sequential elements.

7. The method of claim 6, wherein slack is given by equation:

$$\text{Slack} = \text{AT}_{sequential} - (\text{AT}_{gating} + \text{Delay}_{\textit{eff-Min}}),$$

wherein $\text{AT}_{gating}$ represents data signal at an input of the gating element, and the arrival time (AT) of a clock signal at the sequential element is represented by $\text{AT}_{sequential}$.

8. The method of claim 1, wherein the clock gating elements are configured at multiple levels, having a clock gate element feed another clock gate element, which in turn feeds an endpoint, forming sets of N serially connected elements in the clock tree, wherein N is an integer greater than 1.

9. The method of claim 1, wherein the gating elements are located by tracing back from the endpoints of the clock distribution network to determine which driving gating elements have unbalanced skew and critical slack.

* * * * *